April 5, 1932. C. J. MIDLAM 1,852,254
METHOD OF MAKING ICE CREAM DIPPERS
Filed Dec. 6, 1930
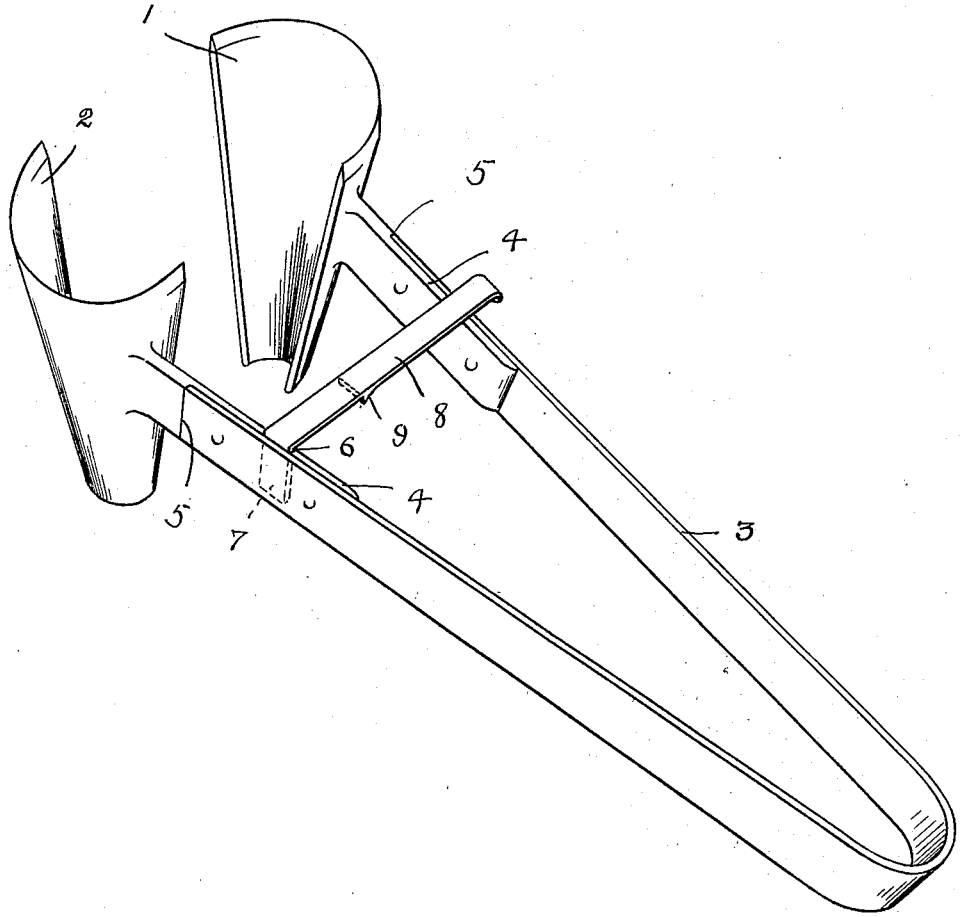
Inventor
Claude J. Midlam.
By Geo. Stevens.
Attorney Patented Apr. 5, 1932

1,852,254

UNITED STATES PATENT OFFICE

CLAUDE J. MIDLAM, OF DULUTH, MINNESOTA

METHOD OF MAKING ICE CREAM DIPPERS

Application filed December 6, 1930. Serial No. 500,572.

This invention relates to ice cream dippers or scoops, the principal object being to provide a dipper in which conically shaped servings may be most conveniently placed within a pasty cone.

I am aware that two part conically shaped dippers are old in the art, but the novel assembly and combination of cooperative elements in my present invention are deemed novel.

Other objects, advantages, and novel characteristics of the invention will appear in the following description thereof.

Referring now to the accompanying drawing, forming part of this application, and wherein like reference characters indicate like parts:

The illustration is a perspective view of one of my improved ice cream dippers.

The dipper comprises the two part conically shaped receptacle illustrated at 1 and 2, and the unitary spring handle 3.

The dipper portion is novel in that it is formed with each half having integral therewith a handle receiving shank 4, the dipper being preferably of cast metal. The shanks 4 are stepped as at 5, forming a terminal portion of less thickness than that adjacent the bowl of the dipper, and which stepped portion is approximately the thickness of the spring metal used for the handle 3, so that when the terminals of the latter are fastened as by riveting or otherwise to the shanks a smooth and uniform thickness and width results.

One of the stepped shanks as at 6 is further stepped or notched for the reception of the downwardly bent end 7 of the catch 8, which, when in position, extends transverse the handle and overlaps the opposite terminal of same.

This catch is of flat spring metal, biased toward the edge of the handle portion which it intermittently engages, and is provided with a transverse dog 9 upon the lower edge thereof for locking engagement with the upper edge of the cooperating handle portion so that when the two inner terminals of the spring handle are brought together, closing the bowl of the dipper, the catch will become automatically engaged and hold same in such closed position for convenience during the dipping operation. Then when a serving of ice cream is thus engaged and about to be deposited within a cone, all that is necessary is to slightly raise the free end of the catch 8 when the two halves of the device will be separated by the spring action of the handle and the ice cream readily deposited, apex end first, into the cone, thus avoiding any necessity of pushing or crowding the ice cream into the cone to keep it from smearing the sides of same as is well known to those versed in the art; it, of course, being understood that both ends of the bowl portion of the dipper are open.

Simplicity of construction of the device is a paramount feature and thought to be readily appreciated from the foregoing description.

The preferred process of construction of this improved dipper is that of casting the bowl with its two projecting handle shanks in an integral piece, then uniting the handle to said handle shanks by riveting or otherwise, after which the bowl is severed into two parts, the two parts being captively separable by means of the handle, thus insuring registration of the parts when being manipulated, and resulting in a most sanitary device having no corners in which the food may lodge.

Having thus described my invention, what I claim and desire to secure by Letters Patent, is:

The herein described method of constructing a dipper consisting of first forming same in two separate parts, then uniting them, and subsequently dividing one of said parts to form three united parts, two of which are captively separable.

In testimony whereof I affix my signature.

CLAUDE J. MIDLAM.